(12) United States Patent
Browning

(10) Patent No.: US 9,726,312 B2
(45) Date of Patent: Aug. 8, 2017

(54) MASTER FLANGE ASSEMBLY

(71) Applicant: James Browning, Berea, OH (US)

(72) Inventor: James Browning, Berea, OH (US)

(73) Assignee: James Browning, Berea, OH (US)

( * ) Notice: Subject to any disclaimer, the term of this patent is extended or adjusted under 35 U.S.C. 154(b) by 0 days.

(21) Appl. No.: 14/533,042

(22) Filed: Nov. 4, 2014

(65) Prior Publication Data

US 2015/0123396 A1    May 7, 2015

Related U.S. Application Data

(60) Provisional application No. 61/899,852, filed on Nov. 4, 2013.

(51) Int. Cl.
*F16L 23/032* (2006.01)
*F16L 23/026* (2006.01)

(52) U.S. Cl.
CPC .......... *F16L 23/032* (2013.01); *F16L 23/026* (2013.01)

(58) Field of Classification Search
CPC .............................. F16L 23/032; F16L 23/026
USPC .................................................. 285/414, 416
See application file for complete search history.

(56) References Cited

U.S. PATENT DOCUMENTS

| | | | | |
|---|---|---|---|---|
| 280,353 A | * | 7/1883 | Corris ................. | F16L 23/0283 285/414 |
| 653,280 A | * | 7/1900 | Barthels et al. ........ | F16L 13/02 285/416 |
| 696,603 A | * | 4/1902 | Smith ................... | F16L 55/178 285/414 |
| 826,154 A | * | 7/1906 | Doolittle ............... | E21B 43/106 285/416 |
| 1,291,646 A | * | 1/1919 | Hughes ................. | F16L 23/024 285/412 |
| 1,817,289 A | * | 8/1931 | Benz ..................... | F16L 23/026 285/416 |
| 2,446,481 A | * | 8/1948 | Letterman ............. | F16L 23/12 285/416 |

(Continued)

FOREIGN PATENT DOCUMENTS

| | | | | |
|---|---|---|---|---|
| FR | 2729732 A1 | * | 7/1996 | ............ F16L 23/032 |
| FR | 2781547 A1 | * | 1/2000 | ............ F16L 23/036 |

(Continued)

*Primary Examiner* — David E Bochna
(74) *Attorney, Agent, or Firm* — Benesch, Friedlander, Coplan & Aronoff, LLP

(57) ABSTRACT

Master flange assemblies are disclosed herein. In one embodiment, a master flange assembly includes a master flange and a tube. The master flange includes a central aperture, at least one through-hole, and a plurality of cavities. The tube is arranged to pass through the central aperture and form the master flange assembly when secured to the master flange. In one embodiment, the plurality of cavities are recessions formed in a first surface of the master flange, wherein the recessions do not pass through the master flange. In one embodiment, the plurality of cavities are separated by ribs. In one embodiment, the master flange includes a shoulder recessed from a second surface of the master flange and adjacent to the central aperture. The tube includes a rim that engages the shoulder of the master flange when the tube is secured to the master flange to form the assembly.

12 Claims, 11 Drawing Sheets

(56) References Cited

U.S. PATENT DOCUMENTS

| | | | | |
|---|---|---|---|---|
| 2,669,467 A * | 2/1954 | Wolferz | ............ | F16L 23/0286 285/416 |
| 2,749,149 A * | 6/1956 | Carpenter | ........... | F16L 23/0283 285/363 |
| 3,418,009 A * | 12/1968 | Pollia | ..................... | F16L 5/022 285/414 |
| 3,515,416 A * | 6/1970 | Pickert | ................ | F16L 23/0283 285/413 |
| 3,604,733 A * | 9/1971 | Hubbell, III | ........ | F16L 23/0283 285/414 |
| 3,727,955 A * | 4/1973 | Carter | ................ | F16L 23/0286 285/368 |
| 3,909,049 A * | 9/1975 | Blatnica | .................. | F16L 23/20 285/416 |
| 4,372,587 A * | 2/1983 | Roche | .................... | F16L 47/14 285/414 |
| 4,458,924 A * | 7/1984 | Schlicht | ................ | F16L 23/028 285/416 |
| 4,484,771 A * | 11/1984 | Schulz | ................ | F16L 23/0283 285/416 |
| 4,810,011 A * | 3/1989 | Hashimoto | ............ | F16L 23/026 285/116 |
| 4,832,383 A * | 5/1989 | Roussel | ................ | F16L 23/026 285/416 |
| 5,314,215 A * | 5/1994 | Weinhold | ............... | F16L 23/032 285/415 |
| 6,264,251 B1 * | 7/2001 | Kunsman | ............... | F16L 23/032 285/415 |
| 6,283,157 B1 * | 9/2001 | Rocheleau | .............. | F16L 23/12 285/416 |
| 7,111,876 B2 * | 9/2006 | Hayashi | ................ | F16L 23/032 285/415 |
| 2004/0046391 A1 * | 3/2004 | Vasudeva | ................ | F01N 13/16 285/412 |

FOREIGN PATENT DOCUMENTS

| | | | | |
|---|---|---|---|---|
| FR | EP 2019245 A1 * | 1/2009 | ............ | F16L 23/032 |
| GB | 910412 A * | 11/1962 | ............ | F16K 49/00 |
| WO | WO 2008106654 A2 * | 9/2008 | .......... | F16L 23/0286 |

* cited by examiner

MASTER FLANGE ASSEMBLY

CROSS-REFERENCE TO RELATED APPLICATIONS

This application claims priority to U.S. Provisional Patent Application No. 61/899,852, titled "Master Flange Assembly," which was filed on Nov. 4, 2013, and which is expressly incorporated by reference herein in its entirety.

TECHNICAL FIELD

The disclosed material relates generally to a master flange assembly for use with a header of an internal combustion engine and more particularly to a master flange assembly that accommodates various sizes and shapes of tubing for use with a header of an internal combustion engine.

BACKGROUND

Internal combustion engines have been used for well over a century to power vehicles such as automobiles, trucks, buses, boats, motorcycles and the like. Such internal combustion engines typically include multiple cylinders in which a mixture of fuel and air combust to produce the energy and power required to propel a vehicle. A byproduct of the internal combustion process is exhaust gas that collects in each cylinder. An exhaust manifold is typically secured to the engine to collect the exhaust gases from the cylinders and channel the exhaust gases to the vehicle's exhaust system. Exhaust manifolds are typically one-piece cast iron or stainless steel systems. Some aftermarket exhaust manifolds, commonly known as headers, can include a series of tubes, with one tube dedicated to each cylinder. The tubes typically converge into a single tube called a collector. There is a need for improved headers that provide a user with the flexibility to use various sized and shaped tubes to remove exhaust gases from the cylinders of an engine.

SUMMARY

Master flange assemblies are disclosed herein. In one embodiment the master flange assembly is customized to accommodate many applications. In one embodiment, a master flange assembly includes a master flange and a tube. The master flange includes a central aperture, at least one through-hole, and a plurality of cavities. The tube is arranged to pass through the central aperture of the master flange and, when secured to the master flange, form the master flange assembly. In one embodiment, the plurality of cavities are recessions formed in a first surface of the master flange, wherein the recessions do not pass all the way through the master flange. In one embodiment, the plurality of cavities are separated by ribs. In one embodiment, the master flange includes a shoulder recessed from a second surface of the master flange and adjacent to the central aperture. In one embodiment, the tube includes a rim that engages the shoulder of the master flange when the tube is secured to the master flange to form the master flange assembly.

BRIEF DESCRIPTION OF THE DRAWINGS

Objects and advantages together with the operation of the invention may be better understood by reference to the detailed description taken in connection with the following illustrations, wherein.

DETAILED DESCRIPTION

The apparatus and methods disclosed in this document are described in detail by way of examples and with reference to the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of master flange assemblies and methods of manufacturing such master flange assemblies are hereinafter disclosed and described in detail with reference made to FIGS. 1-11.

Disclosed herein are master flange assemblies that includes a master flange and a variety of tube sections that provides for a flexible and configurable system for designing and manufacturing headers for engines. In one example, the various tube sections can be secured to a number of master flanges by a welding process. Each master flange assembly can be secured to an engine block to form a part of a header for collecting and channeling exhaust gases from cylinders in the engine. The master flange assemblies can be customized to accommodate the space available in the engine compartment, the desired size and shape of tube desired, along with other restrictions and preferred requirements.

Figure 1:
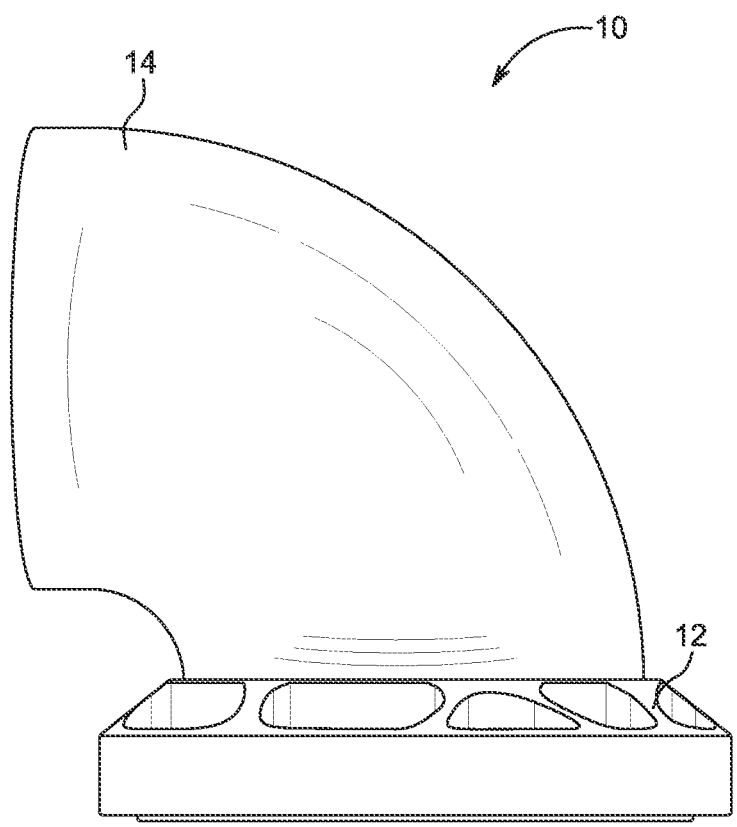
FIG. 1 is a plan view illustrating one embodiment of a master flange assembly according to the detailed disclosure.
Figure 2:
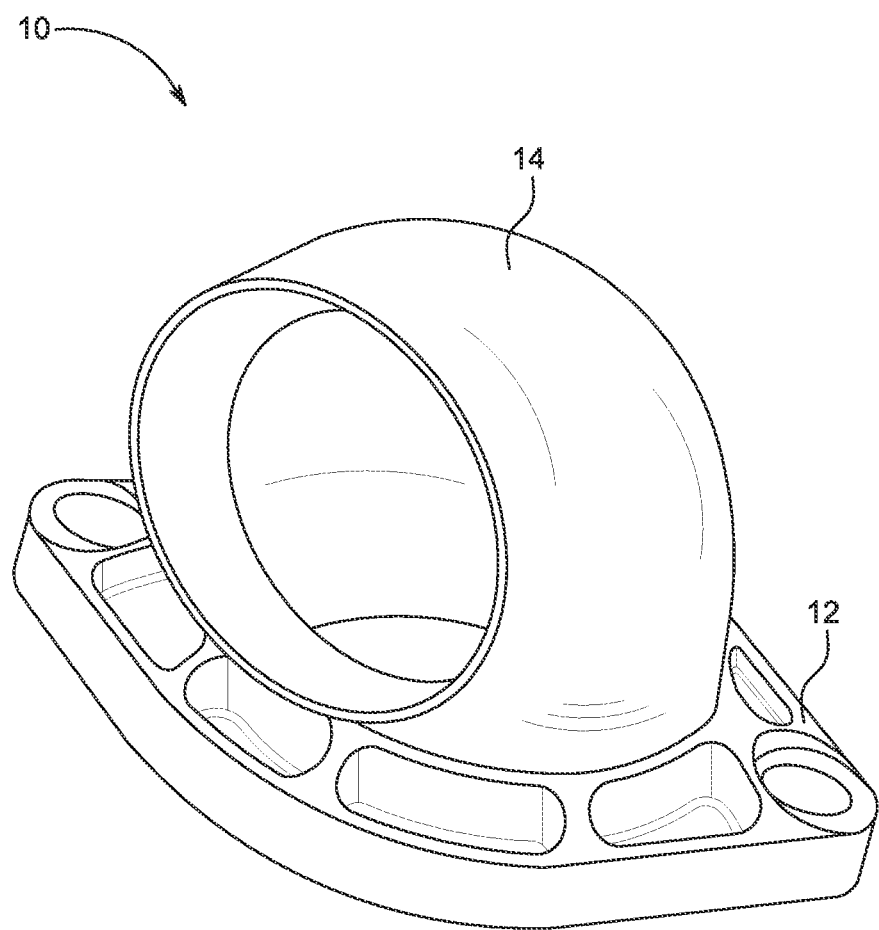
FIG. 2 is a perspective view of the master flange assembly of FIG. 1.
Figure 3:
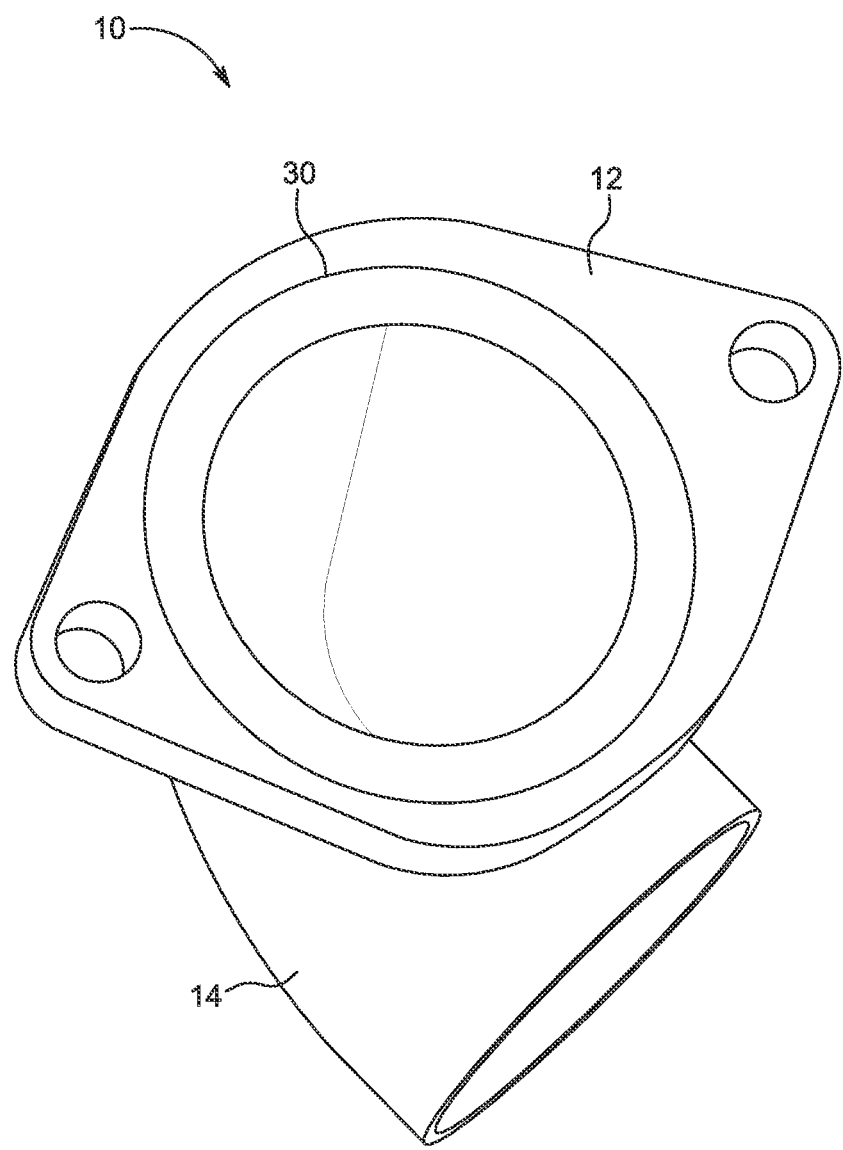
FIG. 3 is another perspective view of the master flange assembly of FIG. 1.

An example of a novel master flange assembly 10 is illustrated in FIG. 1. The master flange assembly 10 includes a master flange 12 and an elbow-shaped tubular section ("elbow") 14. FIG. 2 illustrates a perspective view of the master flange assembly 10, and FIG. 3 illustrates another perspective view of the master flange assembly 10. It will be understood that although the elbow 14 is illustrated as a relatively short tubular section, such an illustration is for convenience only. The elbow 14 can be longer in length to accommodate the distance from the engine block to the vehicle exhaust system. However, in one embodiment, the elbow 14 can be the length generally illustrated in the FIGS. 1-3, 6 and 7, in which case, the elbow 14 can be arranged to provide for a surface that allows for welding additional lengths of tubing to the elbow 14. In such an embodiment, the additional lengths of tubing can be arranged to accommodate the distance from the elbow 14 to the exhaust system of the vehicle.

Figure 4:
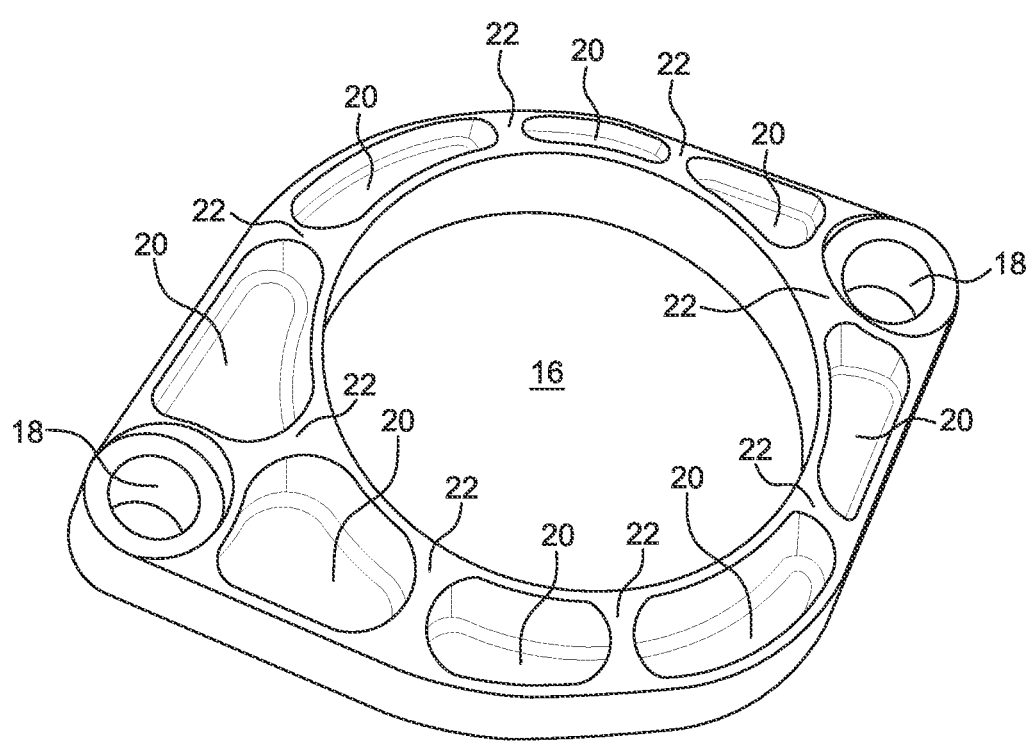
FIG. 4 is a perspective view of the master flange of the master flange assembly of FIG. 1.

FIG. 4 illustrates the master flange 12 as viewed from the top. The master flange 12 includes a central aperture 16, two through-holes 18, and a series of cavities 20 that form a series of ribs 22. The central aperture 16 is arranged so that sections of tubing, such as the elbow 14, can be passed through the central aperture 16. The two through-holes 18 are arranged so that bolts or other fastening devices can be passed through the through-holes 18 so as to secure the master flange 12 to a surface. In one example, through-holes 18 are arranged so that the master flange 12 can be secured to the surface of an internal combustion engine proximate to the cylinders of the engine. The cavities 20 are formed as recessions in the top surfaces of the master flange 12. The cavities 20 do not pass through the body of the master flange 12. The cavities 20 include a floor and multiple walls rising from the floor of the cavity 20 to the top surface of the master flange 12. As is shown in FIG. 4, the walls of the cavities form ribs 22 in the top surface of the master flange 12. As will be discussed further, the walls and floors of the multiple cavities 22 increase the surface area of the top of the master flange 12, which allows for the master flange 12 to dissipate more heat than a flange without cavities.

Figure 5:
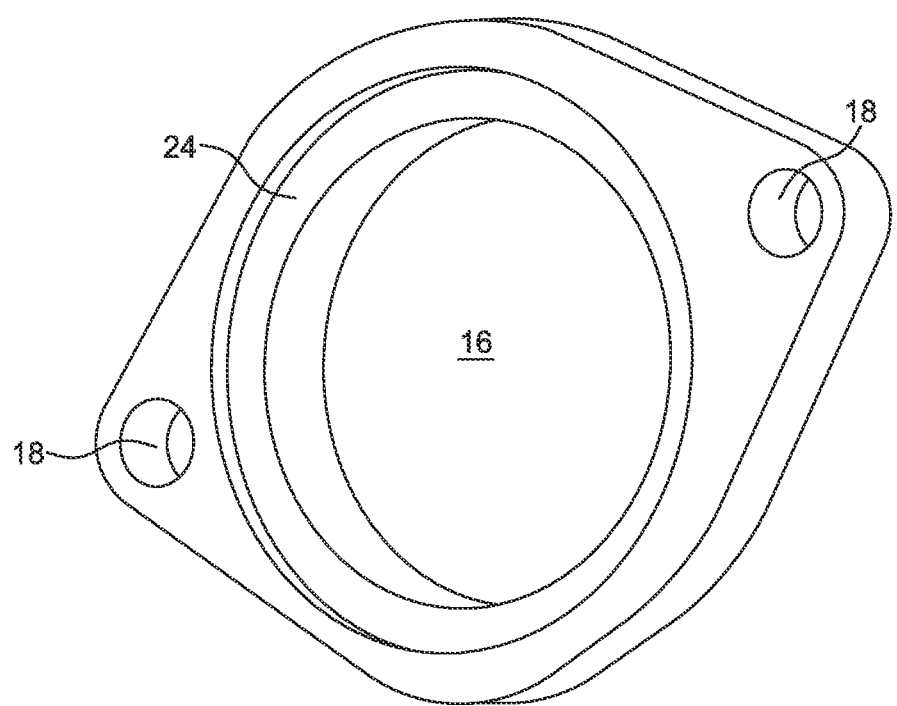
FIG. 5 is another perspective view of the master flange of the master flange assembly of FIG. 1.

FIG. 5 illustrates the master flange 12 as viewed from the bottom. As shown, the central aperture 16 and two through-holes 18 pass through the body of the master flange 12. The bottom side of the central aperture 16 includes a shoulder 24. The shoulder 24 is formed by a circular recession that has a larger diameter than the central aperture 16. The perimeter of the shoulder 24 is concentric with the central aperture 16. As will be further described herein, the shoulder 24 engages with the elbow 14 when the master flange 12 and elbow 14 are assembled into a master flange assembly 10.

Figure 6:
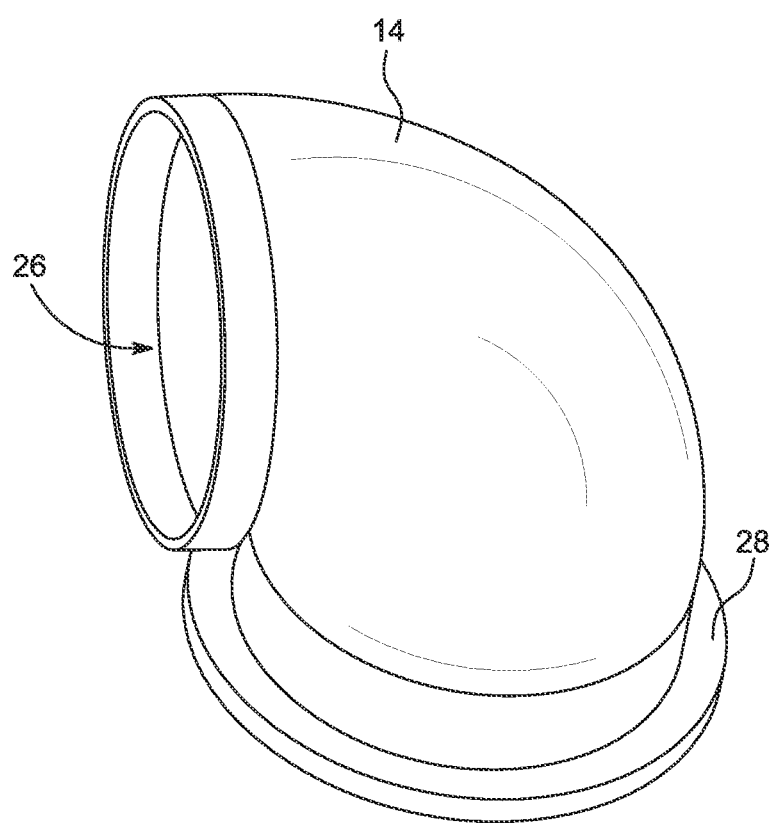
FIG. 6 is a perspective view of the elbow of the master flange assembly of FIG. 1.
Figure 7:
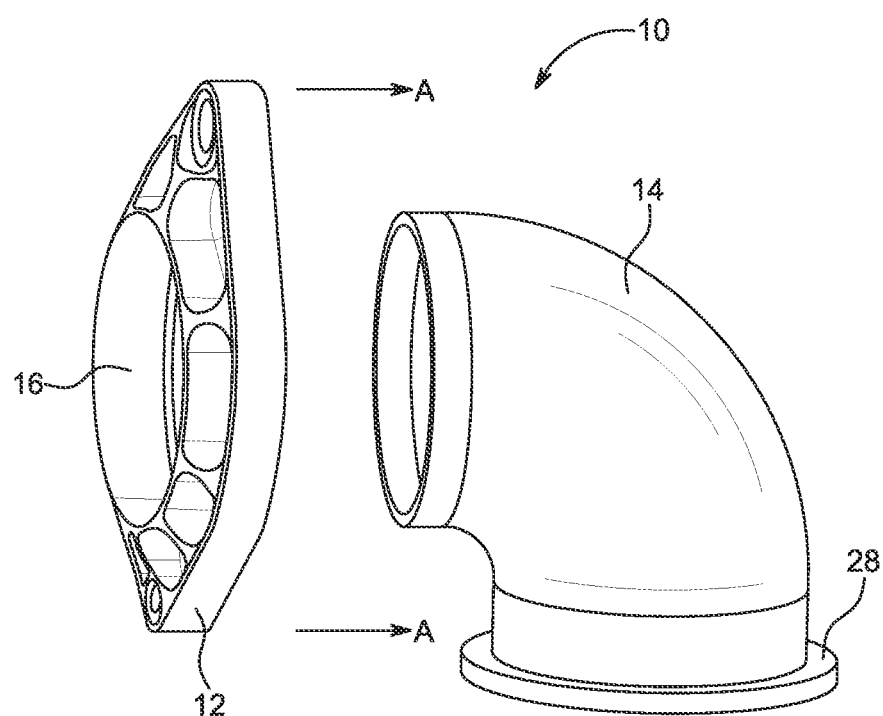
FIG. 7 is a exploded view of the master flange assembly of FIG. 1.

FIG. 6 illustrates a perspective view of the elbow 14. The elbow 14 is a tubular structure with a passage 26 passing through the structure. The elbow 14 includes a lip or rim 28 that extends horizontally from one end of the elbow 14. With reference to FIG. 7, the master flange 12 and elbow 14 can be assembled into a master flange assembly 10 by moving the master flange 12 along the path shown by arrows "A" so that the elbow 14 passes through the central aperture 16 of the master flange 12. The master flange 12 can rotate ninety degrees as the elbow 14 continues to pass through the central aperture 16, until the shoulder 24 of the master flange 12 engages with the rim 28 of elbow 14 such that the rim 28 is seated on the shoulder 24 and prevents any further relative movement of the master flange 12. The resulting master flange assembly 10 is best illustrated in FIGS. 1-3. Once the rim 28 of the elbow 14 is seated on the shoulder 24 of the master flange 12, the master flange 12 and elbow 14 can be permanently joined by welding along the interface 30 (as best illustrated in FIG. 3) between master flange 12 and the elbow 14.

Figure 8:
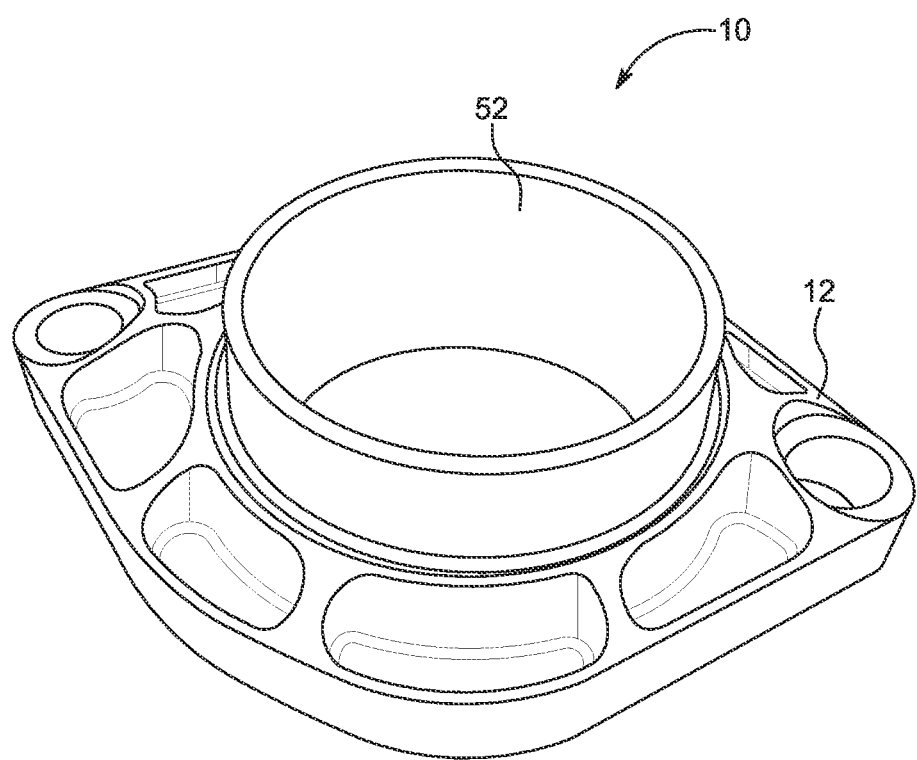
FIG. 8 is a perspective view of another embodiment of a master flange assembly according to the detailed disclosure.
Figure 9:
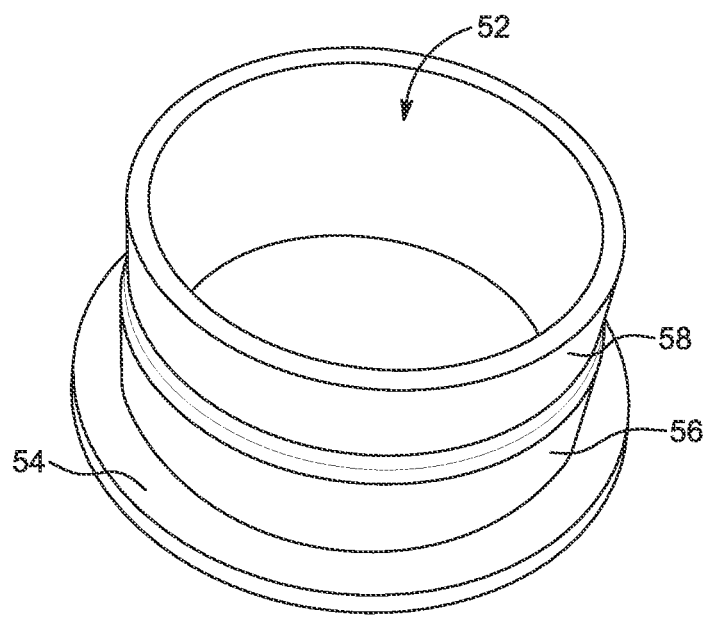
FIG. 9 is a perspective view of the straight tube of the master flange assembly of FIG. 8.
Figure 10:
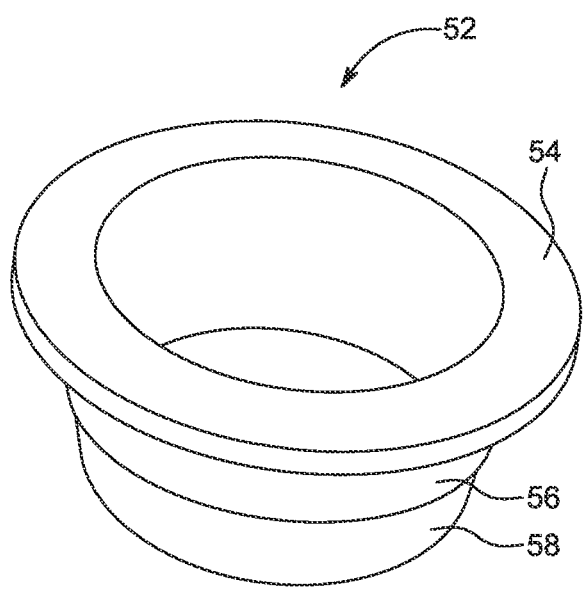
FIG. 10 is another perspective view of the straight tube of the master flange assembly of FIG. 8.
Figure 11:
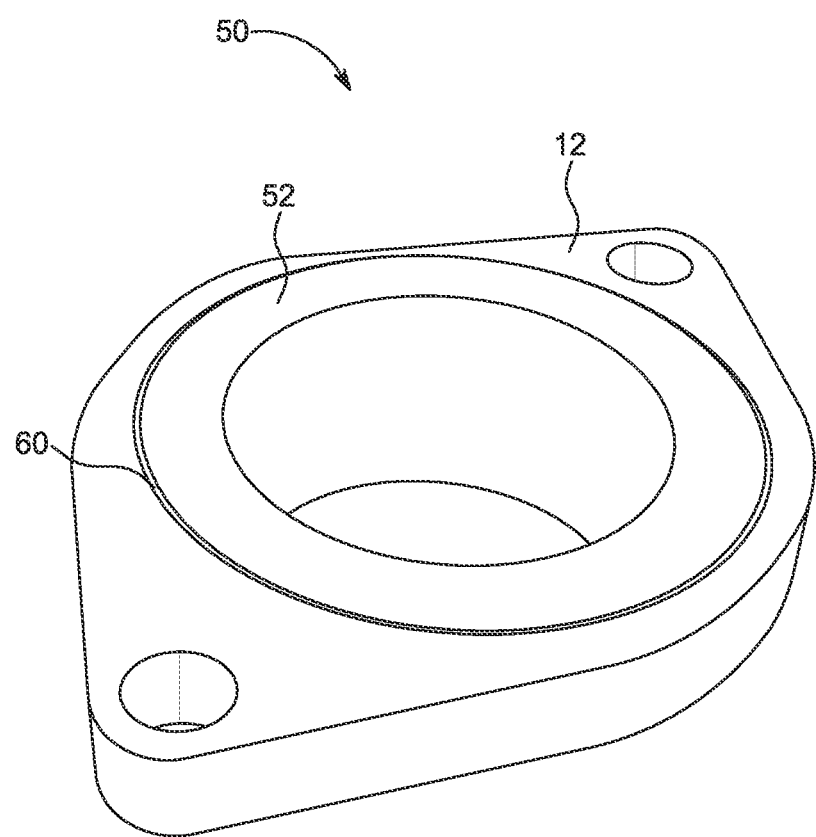
FIG. 11 is another perspective view of the master flange assembly of FIG. 8.

FIGS. 8-11 illustrate another embodiment of a master flange assembly 50. It is noted that the master flange 12 as described above and illustrated in FIGS. 1-7 is used in the embodiment of the master flange assembly 50 illustrated in FIGS. 8-11. FIG. 8 illustrates the master flange 12 assembled with a straight tubular section ("straight tube") 52. As illustrated in FIGS. 9-10, the straight tube 52 includes a rim 54 similar to the rim 28 of the elbow 14. The straight tube 52 also includes a first section 56 and a second section 58, where the diameter of the first section 56 is larger than the diameter of the second section 58. The master flange assembly 50 can be assembled by passing the second section 58 of the straight tube 52 through the central aperture 16 of the master flange 12 until the rim 54 of the straight tube 52 engages the shoulder 24 of the master flange 12. As will be appreciated, the first section 56 of the straight tube 52 will be generally positioned within the central aperture 16 of the master flange 12, and the second section 58 of the straight tube 52 extends above the master flange 12. Once the rim 54 of the straight tube 52 is seated on the shoulder 24 of the master flange 12, the master flange 12 and straight tube 52 can be permanently joined by welding along the interface 60 (as best illustrated in FIG. 11) between master flange 12 and the straight tube 52.

It will be understood that although the straight tube 52 is illustrated as a relatively short tubular section, such an illustration is for convenience only. The straight tube 52 can be longer in length and deviate from a straight path to accommodate the distance from the engine block to the vehicle exhaust system. However, in one embodiment, the straight tube 52 can be the length generally illustrated in the FIGS. 8-11, in which case, the second section 58 of the straight tube 52 can be arranged to allows for welding of additional lengths of tubing to the straight tube 52. In this example, the straight tube 52 can serve as a universal adaptor that can accommodate the welding of many different tube lengths and configurations. In such an embodiment, the additional lengths of tubing can be arranged to accommodate the distance from the straight tube 52 to the exhaust system of the vehicle.

As will be appreciated from the embodiments described and illustrated herein, the master flange 12 can accommodate a variety of shapes and sizes of tubes. In other words, the master flange assemblies are modular in nature and can be customized to meet many requirements, circumstances, needs, and specifications. Such arrangements can provide for flexibility in designing and/or manufacturing a header for an internal combustion engine. In one example, a number of master flange assemblies are secured to an engine so that each cylinder of the engine is in communication with a master flange assembly. Each master flange assembly can include a unique arrangement of master flange and tube segment. If one of the master flange assemblies is positioned in an area of the engine compartment that offers limited room, a tight elbow tube can be used by the master flange assembly to accommodate the limited space offered by the engine compartment. If another of the master flange assemblies is positioned in an area where the tubing has to initially extend generally straight from the master flange, a straight portion of tubing can be used with the master flange.

It will be understood that the master flange assemblies can be secured to the engine with sufficient clamping force so as to limit or eliminate leakage from exhaust gases emerging from the cylinders. Furthermore, the bottom surface of the master flange can be ground flat and the tubes can be arranged to be coplanar with the bottom surface of the master flange to additional prevent leakage.

The cavities 20 and ribs 22 of the master flange can contribute to the performance of the headers in a number of ways. In one example, the cavities 20 reduce the weight of the master flanges, which can increase the performance of the vehicle and provide for more efficient and effective installation of headers. The cavities 20 and ribs 22 combine to provide greater surface area as compared to a flange that does not have cavities or as many cavities as the master flange 12 disclosed herein. The increase in surface area results in better temperature control of the master flange and the area adjacent to the master flange. In other words, the master flange and the area adjacent to the master flange will run cooler due to the increase in surface area being more efficient in dispersing heat. The lower running temperatures can provide for more efficient operation of the engine. In addition, the decrease in temperature can result in less or no warping of components during the service life of the master flange assemblies, again resulting in more efficient and effective operation of the engine. The ribs further structurally strengthen the master flange, which will also further prevent warping during the service life of the master flange.

The tubes can also be fabricated to increase the performance of the engine. For example, bending tubing to accommodate space constraints can be problematic. For example, when a tube is bent, kinking of the tube is a common problem. Typically, when attempting to bend a tube to a radius that is tighter than the diameter of the tube, the tube is likely to kink. Therefore, traditional tube bending may limit the diameters of the tubes used in a header, thus, limiting performance. Furthermore, bending of tubes results in the thinning of the wall of the outer portion of the bend. Due to the heat of the exhaust gases, the thinner portion of the bent tube can fail prematurely and limit the service life of the header. However, the master flange assemblies that incorporate elbows as described herein do not use bent tubes. The elbows as described herein are cast and not bent. This provides for a tighter radius of bend and a uniform wall thickness throughout length of the elbow. Thus, providing an elbow that will match the service life of the other components or sections of the header. In one example, the elbow tubing is formed from stainless steel and the casting processed used to form the elbow tubing is an investment casting process. Such a process can produce headers that can accommodate smaller spatial requirements. Thus, the headers can be positioned closer to the engine block and not interfere with other components of the vehicle such as steering shaft and accessory mounting points. Therefore, an engine can be fit into a small engine compartment than with conventional headers, and larger tubes can be accommodated to increase engine performance. Furthermore, it will be understood that the degree of bend of the elbow can be any degree that meets the requirements or circumstances of the particular engine and the particular engine compartment.

The master flange assemblies can be fabricated from a variety of materials. In one example, the master flange and tubing is fabricated from stainless steel. In another example, the master flange and/or the tubing is fabricated from AISI Type 321 Stainless Steel.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A master flange assembly comprising:
   a master flange comprising:
      a body;
      a central aperture;
      at least one through hole;
      a plurality of cavities in a first surface of the master flange, where the plurality of cavities do not pass through the body of the master flange;
      a shoulder adjacent to the central aperture and recessed from a second surface of the mater flange that is opposite the first surface of the master flange; and
   a tube including a rim formed on one end of the tube, the tube arranged to pass through the central aperture so that the rim engages the shoulder;
   wherein the tube is secured to the master flange with a weld along an interface of the shoulder and the rim.

2. The master flange assembly of claim 1, wherein the plurality of cavities are separated by one or more ribs.

3. The master flange assembly of claim 1, wherein the tube is a straight tube.

4. The master flange assembly of claim 3, wherein the tube includes a first section with a first outer diameter and a second section with a second outer diameter.

5. The master flange assembly of claim 1, wherein the tube is an elbow tube.

6. The master flange assembly of claim 1, wherein when the rim engages the shoulder, the second surface of the master flange is coplanar with a surface of the tube.

7. A master flange assembly comprising:
   a master flange comprising:
      a body;
      a central aperture;
      at least one through hole;
      a plurality of cavities in a first surface of the master flange, where the plurality of cavities do not pass through the body of the master flange;
      a shoulder adjacent to the central aperture and recessed from a second surface of the mater flange that is opposite the first surface of the master flange; and
   a tube including a rim formed on one end of the tube, the tube arranged to pass through the central aperture so that the rim engages the shoulder;
   wherein the tube is secured to the master flange with a weld along an interface of the rim and the second surface of the master flange.

8. The master flange assembly of claim 7, wherein the plurality of cavities are separated by one or more ribs.

9. The master flange assembly of claim 7, wherein the tube is a straight tube.

10. The master flange assembly of claim 9, wherein the tube includes a first section with a first outer diameter and a second section with a second outer diameter.

11. The master flange assembly of claim 7, wherein the tube is an elbow tube.

12. The master flange assembly of claim 7, wherein when the rim engages the shoulder, the second surface of the master flange is coplanar with a surface of the tube.

* * * * *